United States Patent Office 3,117,715
Patented Jan. 14, 1964

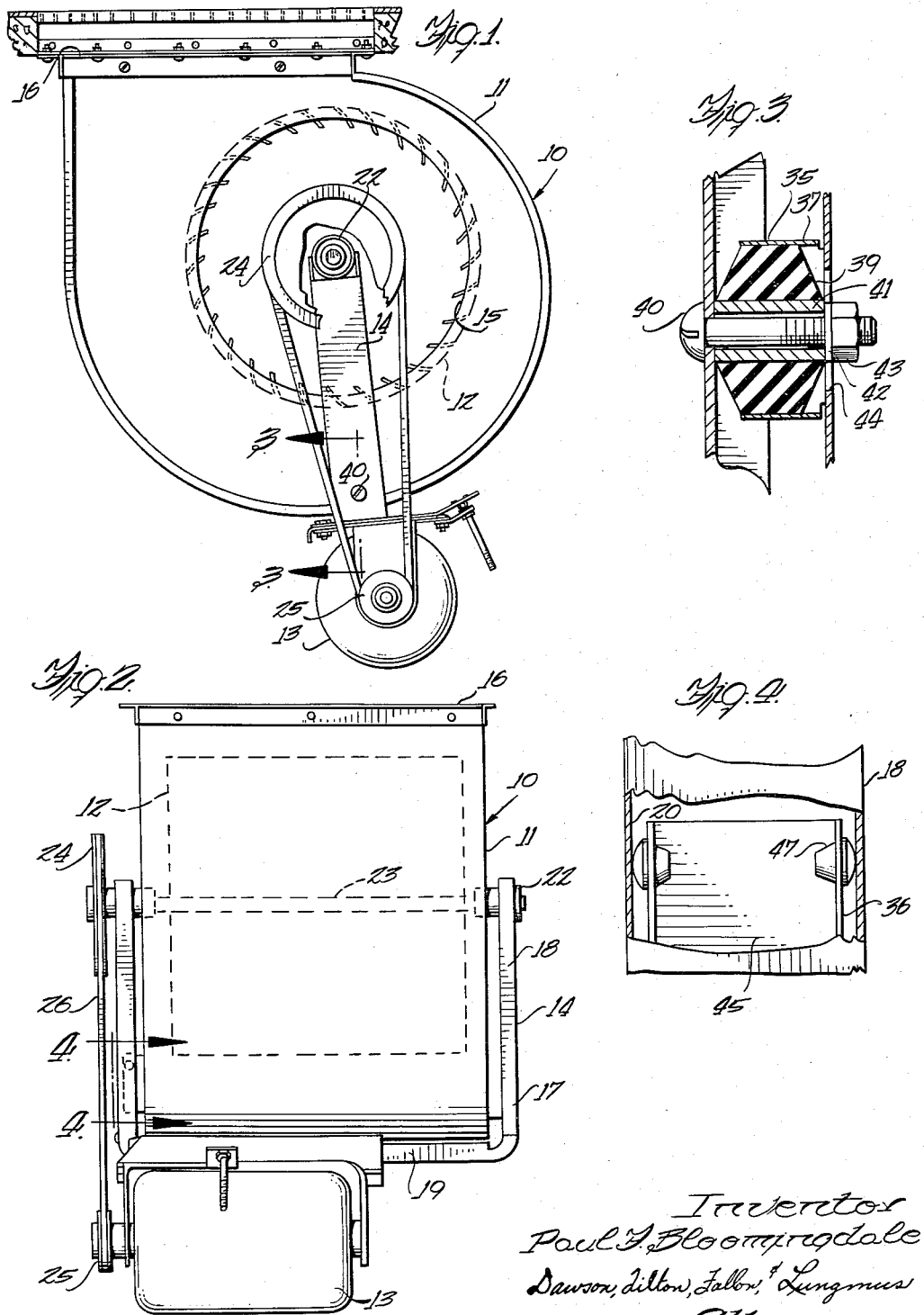

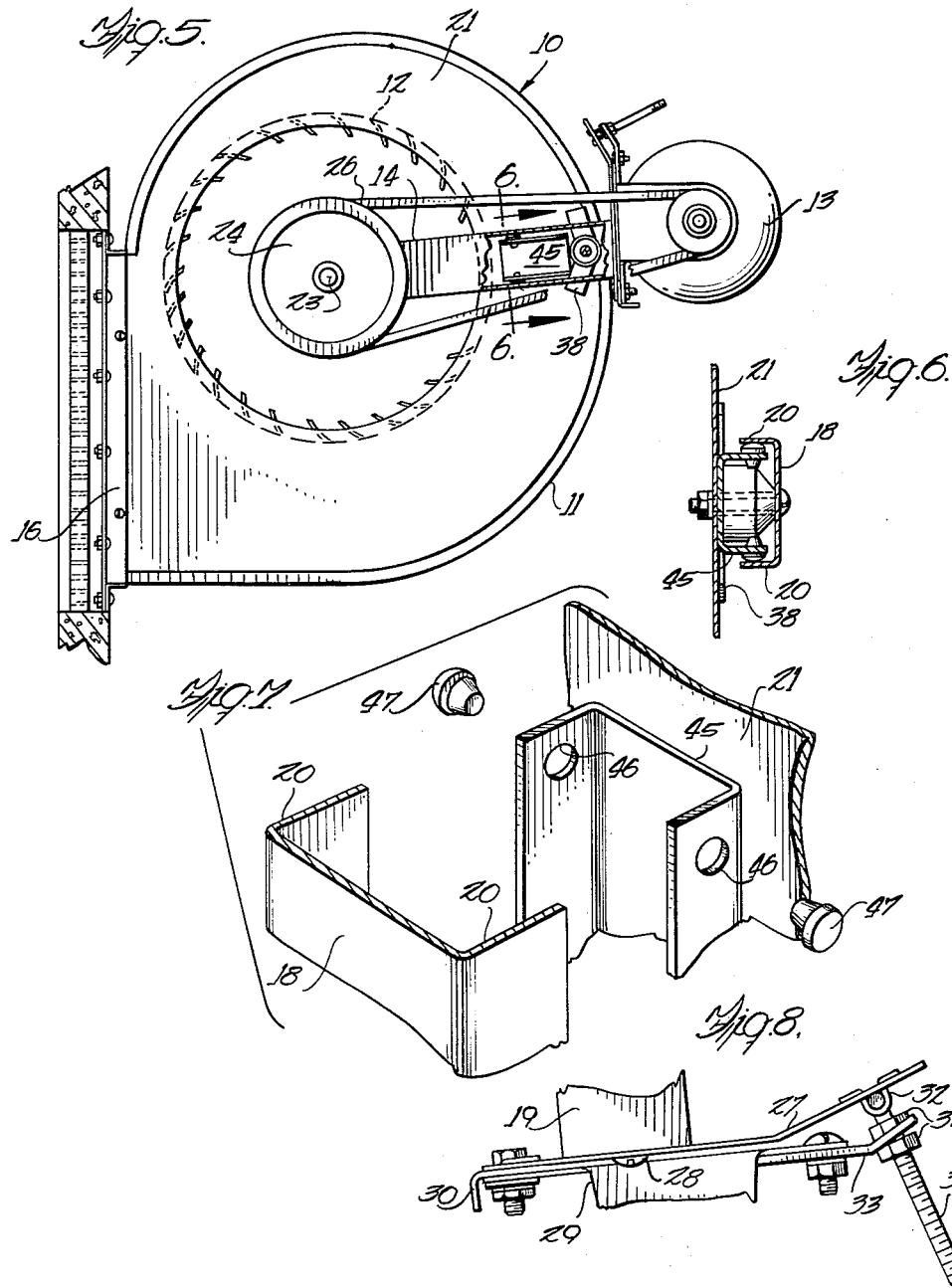

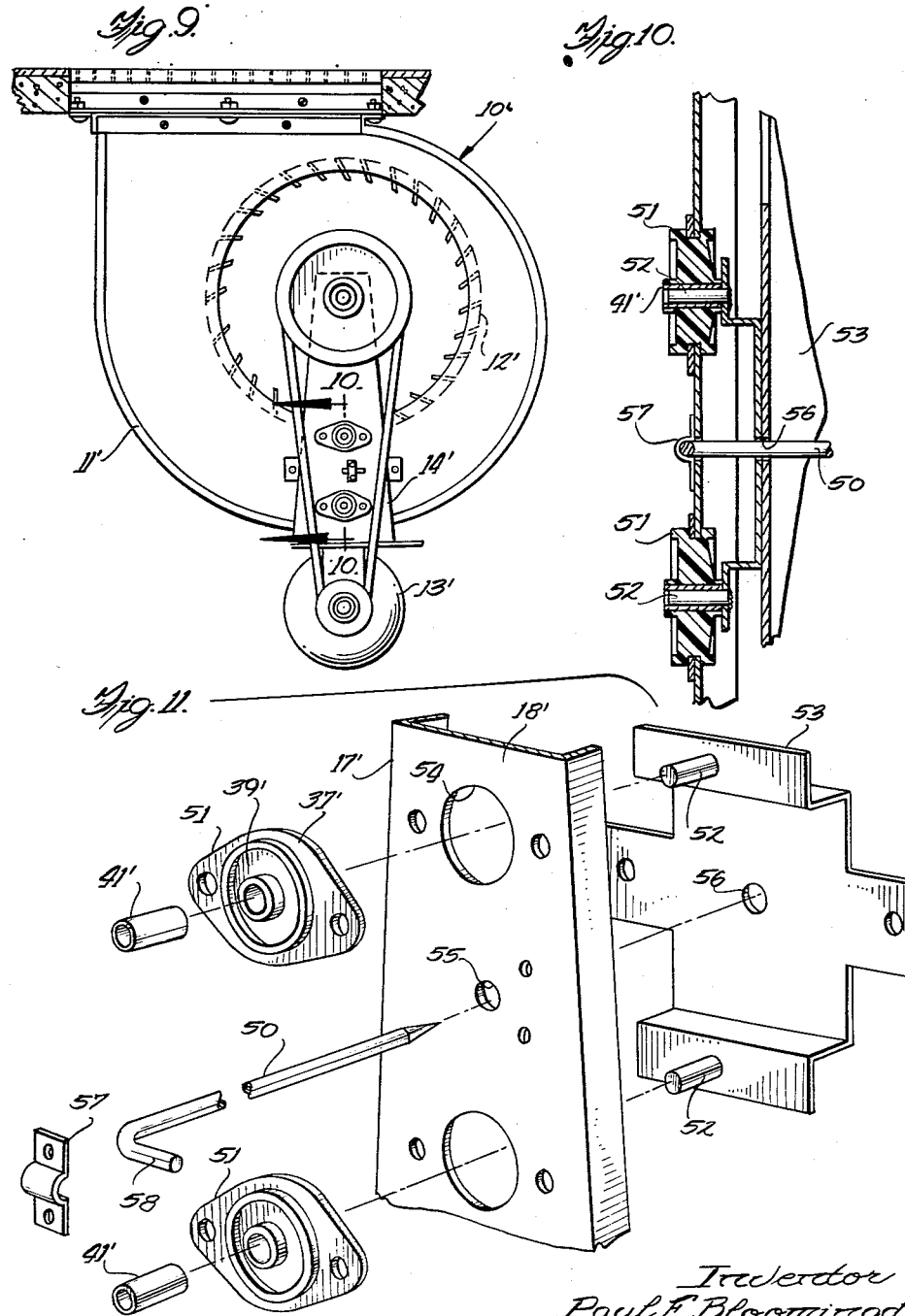

1

3,117,715
BLOWER ASSEMBLY
Paul F. Bloomingdale, Wichita, Kans., assignor to The Coleman Company, Inc., Wichita, Kans., a corporation of Kansas
Filed Dec. 4, 1962. Ser. No. 243,198
16 Claims. (Cl. 230—117)

This invention relates to a blower assembly and, more specifically, to resilient mounting means for a blower wheel and motor.

This application is a continuation-in-part of my copending application Serial No. 81,352, filed January 9, 1961.

As is well known, blowers are frequently characterized according to direction of discharge, e.g., horizontal discharge, down-blast discharge, up-blast discharge, etc. Where the impellers and motors of such blowers are carried by resilient mounts, it has been generally recognized that these various types of blowers are not interchangeable. Thus, a vertical discharge blower cannot simply be tipped on its side for use as a horizontal discharge blower without impairing the function and shortening the life of the resilient mounts because of changes in the load imposed on those mounts. Ordinarily, as a conventional blower unit is rotated about a horizontal axis to change its direction of discharge, the load upon the resilient mounts will shift between compression, shear and tension loads and a mounting specifically designed for operation under one type of load will seldom if ever be equally effective in resisting another type of load. Furthermore, a change in the load acting upon the resilient mounts of a reoriented blower may be accompanied by a shift in the relative positions of the impeller and blower housing with a resulting loss in blower efficiency.

Accordingly, it is a main object of the present invention to provide a blower assembly which overcomes the aforementioned disadvantages of conventional blower constructions. More specifically, it is an object of this invention to provide a resilient mounting for the impeller and motor of a blower unit so that the entire unit may be rotated for discharge in any direction without impairing the function or shortening the life of the mounting means. Another object is to provide a versatile blower unit which may be oriented for delivery of air in any direction without removing and relocating the parts which mount the motor and impeller upon the blower housing.

Other objects will appear from the specification and drawings in which:

FIGURE 1 is a side elevational view of a blower assembly embodying the present invention, the blower being oriented for upward discharge and being partially broken away to illustrate structural details thereof;

FIGURE 2 is another side elevational view of the blower assembly;

FIGURE 3 is an enlarged broken cross sectional view taken along line 3—3 of FIGURE 1;

FIGURE 4 is an enlarged broken side elevational view, taken partly in section, along line 4—4 of FIGURE 2;

FIGURE 5 is a side elevational view of the blower unit with a mounting member thereof partially broken away to illustrate structural features thereof, the blower unit being shown in a position for horizontal discharge;

FIGURE 6 is an enlarged sectional view taken along line 6—6 of FIGURE 5;

FIGURE 7 is a still further enlarged exploded and fragmentary perspective view showing the stabilizer construction of the blower unit;

FIGURE 8 is an enlarged broken elevational view of the blower's tension adjusting means;

FIGURE 9 is a side elevational view of a blower assembly constituting a second embodiment of the present invention;

FIGURE 10 is an enlarged sectional view taken along line 10—10 of FIGURE 9;

FIGURE 11 is a still further enlarged exploded perspective view of the mounting elements for the motor-impeller assembly.

In the embodiment of the invention illustrated in FIGURES 1 through 8 of the drawings, the numeral 10 generally designates a blower unit comprising a blower housing 11, an impeller 12, a motor 13 and a motor-impeller support assembly 14. In the illustration given, the blower housing is of volute shape and is provided with inlet and outlet openings 15 and 16. Within the scroll-shaped housing is the impeller 12 which, as indicated in FIGURES 1 and 5, is of the centrifugal squirrel-cage type. Since such elements and their operation are entirely conventional, a further description is believed unnecessary herein.

The support or suspension assembly 14 includes a generally U-shaped (FIGURE 2) support member 17 having legs 18 extending along vertical planes on opposite sides of the housing and having a horizontal transverse portion 19. Referring to FIGURES 6 and 7, it will be observed that the legs 18 of the support member are generally channel-shaped with the flanges 20 thereof extending inwardly towards the planar sides 21 of housing 11.

At the ends of arms 18 are anti-friction bearings 22 which rotatably receive the end portions of horizontal impeller shaft 23. One end of the shaft projects axially beyond a bearing 22 and arm 18 and carries a pulley 24. A similar pulley 25 is carried by the motor shaft and a belt 26 is entrained about the pulleys.

Referring to FIGURES 2 and 8, it will be noted that a motor mounting plate 27 is affixed by bolts 28 to the transverse portion 19 of the support member 17. The base 29 of the motor is bolted along one of its edges to a motor mounting bar 30 which is in turn bolted to an adjacent edge portion of motor plate 27. Adjusting means is provided along the opposite edge of the motor plate for flexing the plate and motor base apart or closer together to increase or decrease belt tension. As shown most clearly in FIGURE 8, the adjusting means comprises a bolt 31 pivotally supported at one end by a stirrup 32 affixed to the motor plate. The threaded shaft of the bolt passes through an apertured extension 33 of the motor base and nuts 34 on opposite sides of the apertured extension determine the extent of separation of the base and motor plates. As the nuts are threaded outwardly towards the free end of bolt 31, the distance between the motor and impeller shafts is increased and belt tension is likewise increased.

The entire support assembly 14 and the impeller and motor carried thereby are connected to the blower housing 11 by vibration-isolating mounting means 35 and by stabilizing means 36. Mounting means 35 is illustrated most clearly in FIGURES 3 and 5 and comprises a vibration isolator cup or retainer 37 secured to opposite sides 21 of the blower housing. The axes of the cups extend along a horizontal line parallel with and disposed between the rotational axes of the motor and impeller shafts. Each cup is equipped with vertically projecting legs 38 which are welded or otherwise secured to the outer surface of the housing's side plates 21.

Within each cup or retainer 37 is an annular cushion or resilient member 39 which has its periphery in snug engagement with the inner side surfaces of the cup (FIGURE 3). A bolt 40 passes through the axial opening of the annular cushion and securely connects that cushion to an arm 18 of support member 14. To prevent axial compression of the cushion, a spacer tube 41 extends about the shank of the bolt within the axial opening of the cushion. As shown in FIGURE 3, bolt 40 is also provided with washer 42 and nut 43. It will be noted that opening 44 in the wall 21 of the housing is of sufficiently greater diameter than washer 42 and nut 43 to permit radial movement of the bolt (and the attached supporting assembly) to the extent permitted by the resilient member 39.

An important aspect of the invention lies in the fact that the vibration-isolating mounting means 35 connects with support member 14 to suspend the supporing assembly and the motor and impeller carried thereby at the center of gravity of the combination. In other words, the supporting assembly 14, motor 13 and impeller 12, as a unit, balance along a line of center of gravity passing through the centers of cushions 39. The compressive forces acting upon the cushions 39 will therefore be of substantially the same magnitude regardless of whether the blower outlet faces upwardly (FIGURE 1), laterally (FIGURE 5), or in any other direction of rotation about a horizontal axis parallel with the axes of the motor and impeller shafts.

It is also of importance that the vibration isolator cushions 39 are annular in shape and provide the same cushioning effect regardless of the radial direction of applied forces. Therefore, the cushions perform equally well regardless of the degree of rotation of the blower about the axes of aligned bolts 40.

The stabilizer means prevents or limits rotation of the balanced motor-impeller supporting assembly about bolts 40 in response to external or transient forces which might act upon the parts. Each stabilizer 36 essentially comprises a U-shaped member 45 having a pair of openings 46 in its side wall which receive resilient elements or plugs 47 (FIGURE 7). When the parts are assembled, the heads of the plugs bear against the inner surfaces of flanges 20 of support arms 18 (FIGURES 4 and 6). The stabilizers thereby restrain rotation of the motor-impeller supporting assembly without at the some time interfering with the vibration absorbing action of cushions 39.

The blower unit 10' of FIGURES 9 through 11 is similar to the unit already described except that the mounting and stabilizing means for the support assembly 14' and the impeller 12' and motor 13' carried thereby comprises a pivot shaft 50 and a pair of mounts 51 in each leg 18' of support member 17'. Each mount 51 comprises a circular-shaped resilient member 39' anchored within the opening of a retainer element 37'. A short tube 41' extends through the resilient member and receives the pin 52 of a mounting bracket 53. Two such pins are provided, each extending along a line parallel with the rotational axes of the impeller and motor.

The retainer elements 37' of the mounts 51 are affixed by bolts or other suitable connecting means directly to the legs 18' of the support member 17'. As shown in FIGURE 11, each leg is provided with a pair of enlarged openings 54 which are of substantially greater diameter than that of pins 52 projecting therethrough. The mounts 51 of each support leg 18' are spaced equal distances from the axis of transverse shaft 50; that is, the mounts 51 and pins 52 received therein are spaced equally from a line which passes transversely through or along the center of gravity of the motor-impeller assembly and which is parallel wth the rotatable shafts of the motor and impeller. The shaft 50 is rotatable with respect to the aligned openings 55 and 56 of the support member 17' and bracket 53 through which it extends and passes completely through the housing 11' and the legs 18' along each side thereof. It is anchored against axial displacement by a shaft-retaining element 57 which clamps the turned end portion 58 against the outer surface of one of the legs 18'.

As in the previously-described embodiment, the motor and impeller assembly are suspended for limited rotation about a horizontal line passing through the center of gravity of that assembly. The compressive forces acting upon the cushions or resilient members 39' which are carried by the support legs 18' will therefore be substantially the same regardless of whether the lower outlet faces upwardly, laterally or in any other direction of rotation about the horizontal axis of shaft 50. It is to be noted in this connection that the mounts 51 with their resilient cushions or elements 39' act as their own stabilizers, thereby eliminating the need for additional stabilizing means.

While in the foregoing I have disclosed two embodiments of the invention in considerable detail for purposes of illustration, it will be understood by those skilled in the art that many of these details may be varied without departing from the spirit and scope of the invention.

I claim:

1. A blower unit comprising a housing and an assembly including an impeller, a motor, and supporting means extending between and being connected to said motor and impeller, mounting means rotatably connecting said assembly to said housing along the line of its center of gravity parallel with the rotational axis of said impeller, and resilient stabilizing means provided by said housing adjacent said mounting means and engaging said supporting means for limiting the extent of rotation of said assembly with reference to said housing.

2. The structure of claim 1 in which said mounting means includes an annular resilient member and a cup receiving said member, said cup being secured to said housing and said resilient annular member being connected to said supporting means.

3. The structure of claim 1 in which said stabilizing means includes resilient elements bearing against and cushioning movement of said supporting means.

4. A blower unit comprising a blower housing and a motor-impeller assembly, said impeller being disposed within said housing and said motor being spaced radially therefrom outside of said housing, said assembly including a supporting member extending between and connecting said motor and impeller, mounting means rotatably connecting said mounting member and said housing along the line of center of gravity of said assembly parallel with the rotational axis of said impeller, and stabilizing means provided by said housing adjacent said mounting means and between said mounting means and said impeller, said stabilizing means cooperatively engaging said supporting member for limiting the extent of rotation of said assembly about said line of center of gravity.

5. The structure of claim 4 in which said supporting member is generally U-shaped and is provided with arms disposed on opposite sides of said blower housing, said mounting means rotatably connecting said arms to opposite sides of said blower housing.

6. The structure of claim 5 in which said mounting means includes a pair of axially aligned annular resilient elements on opposite sides of said blower housing, connecting means connecting said annular resilient elements to the arms of said support member, and a pair of cup-shaped members receiving said annular members and being secured to opposite sides of said housing.

7. The structure of claim 5 in which said arms are channel-shaped and are provided with side flanges extending inwardly towards the sides of said housing, said stabilizing means comprising an element disposed within the channel of each arm and secured to a side of said housing, said element being provided with cushions engaging the flanges of said arm for limiting rotational movement of said assembly about said line of center of gravity.

8. In a blower unit capable of being mounted with the outlet of the casing thereof facing in any of various directions, a motor-impeller assembly including an impeller within said casing, a motor outside of said casing, and a support member extending therebetween, said support member having a pair of arms on opposite sides of said casing, a pair of resilient elements between said arms and the sides of the casing, a pair of cup-shaped members receiving said resilient elements, said cup-shaped members and said resilient elements being secured to said casing and said arms and being disposed with their axes along the line of center of gravity of said assembly to maintain said assembly in balanced condition regardless of the direction said blower unit is rotated about a line parallel with said line of center of gravity.

9. The structure of claim 8 in which stabilizing means are provided adjacent at least one of said resilient elements for limiting the extent of movement of said assembly with reference to said casing about said line of center of gravity.

10. A blower unit comprising a casing and an assembly including an impeller, a motor, and supporting means extending between and connected to said motor and impeller, said supporting means comprising a pair of arms disposed on opposite sides of said casing, and mounting means connecting said assembly to said casing along the line of the center of gravity of the assembly parallel with the rotational axis of said impeller, said mounting means comprising a resilient element and a cup-shaped element on each side of said casing between the casing and one of said arms, one of said elements on each side of said casing being secured to said arm and the other of said elements being secured to said casing, said resilient element being annular in shape and being received within said cup-shaped element to cushion said casing against vibration in any position of said blower unit in which said line of center of gravity is horizontal, said cup-shaped element and said resilient element having their axes extending along the line of center of gravity of said assembly.

11. A blower unit comprising a housing and an assembly including an impeller, a motor, and supporting means extending between and being connected to said motor and impeller, mounting means rotatably connecting said assembly to said housing along the line of its center of gravity parallel with the rotational axis of said impeller, and resilient means disposed between and in engagement with both said housing and said supporting means for limiting the extent of rotation of said assembly with reference to said housing, said resilient means being disposed adjacent said mounting means.

12. The structure of claim 11 in which said mounting means comprises a pivot shaft extending along the rotational axis of said assembly and extending through said supporting means and said housing.

13. The structure of claim 11 in which said resilient means comprises at least one resilient element, a retainer element receiving said resilient element and being anchored to said support means, and means provided by said housing and operatively connected to said resilient element, whereby, said resilient element is interposed between said last-mentioned means and said retainer element for stabilizing said blower assembly.

14. The structure of claim 10 in which said mounting means includes an annular resilient member and a cup receiving said member, said cup being secured to said housing and said resilient annular member being connected to said supporting means.

15. The structure of claim 13 in which a pair of resilient elements and retainer elements are disposed on opposite sides of said mounting means.

16. A blower unit comprising a casing and an assembly including an impeller, a motor, and supporting means extending between and connected to said motor and impeller, said supporting means comprising a pair of arms disposed on opposite sides of said casing, and mounting means connecting said assembly to said casing along the line of the center of gravity of the assembly parallel with the rotational axis of said impeller, said mounting means comprising a shaft pivotally connecting said casing and said arms, and resilient stabilizing means interposed between said casing and said arms adjacent said shaft for limiting the extent of rotation of said assembly about the axis of said shaft, said stabilizing means comprising at least one annular retainer element and a resilient element received therein, one of said elements being connected directly to said casing and the other of said elements being connected directly to said supporting means, whereby, said resilient element cushions and limits rotation of said assembly with respect to said casing and about the axis of said shaft.

No references cited.